(12) United States Patent  
Girard (10) Patent No.: US 7,386,932 B2
(45) Date of Patent: Jun. 17, 2008

(54) LIMITER FOR INTEGRAL FLEXIBLE CIRCUIT SUSPENSION ASSEMBLY AND METHOD OF ASSEMBLING

(75) Inventor: Mark T. Girard, South Haven, MN (US)

(73) Assignee: Applied Kinetics, Inc., Hutchinson, MN (US)

(*) Notice: Subject to any disclaimer, the term of this patent is extended or adjusted under 35 U.S.C. 154(b) by 99 days.

(21) Appl. No.: 11/257,873

(22) Filed: Oct. 25, 2005

(65) Prior Publication Data

US 2006/0044694 A1 Mar. 2, 2006

Related U.S. Application Data

(62) Division of application No. 10/375,896, filed on Feb. 26, 2003, now Pat. No. 6,980,400.

(60) Provisional application No. 60/360,161, filed on Feb. 26, 2002.

(51) Int. Cl.
*G11B 5/127* (2006.01)
*H04R 31/00* (2006.01)

(52) U.S. Cl. .............................. 29/603.06; 29/603.03; 29/603.04; 360/244.2; 360/245.3; 360/245.7

(58) Field of Classification Search ............... 29/592.1, 29/603.01, 603.04, 603.06, 861; 360/240, 360/244, 244.2, 245.3, 245.7
See application file for complete search history.

(56) References Cited

U.S. PATENT DOCUMENTS

| | | |
|---|---|---|
| 5,333,085 A | 7/1994 | Prentice et al. |
| 5,491,597 A | 2/1996 | Bennin |
| 5,568,332 A | 10/1996 | Khan |
| 5,675,454 A | 10/1997 | Hatanai et al. |
| 5,847,902 A | 12/1998 | Clifford, Jr. et al. |
| 5,875,070 A | 2/1999 | Khan et al. |
| 5,877,920 A | 3/1999 | Resh |
| 5,995,328 A | 11/1999 | Balakrishnan |
| 6,067,209 A | 5/2000 | Aoyagi et al. |
| 6,172,853 B1 * | 1/2001 | Davis et al. ............. 360/245.7 |
| 6,202,288 B1 | 3/2001 | Shiraishi et al. |
| 6,381,100 B1 | 4/2002 | Bennin et al. |
| 6,424,498 B1 * | 7/2002 | Patterson et al. ........ 360/245.7 |
| 6,445,546 B1 | 9/2002 | Coon |
| 6,483,670 B1 | 11/2002 | Watanabe |
| 6,515,832 B1 | 2/2003 | Girard |
| 6,587,311 B1 | 7/2003 | Niijima et al. |
| 6,791,798 B1 | 9/2004 | Mei |
| 6,885,523 B1 | 4/2005 | Summers et al. |
| 6,965,501 B1 * | 11/2005 | Pan et al. ................ 360/245.7 |

* cited by examiner

*Primary Examiner*—Paul D Kim
(74) *Attorney, Agent, or Firm*—Kagen Binder, PLLC (57) ABSTRACT

A limiter used to limit the motion of a ring gimbal with attached slider relative to a load beam within a head suspension assembly of a disk drive. The ring gimbal includes a flexible substrate supporting at least one electrical lead and a limiter assembly joined to a portion of the flexible substrate. The ring gimbal also includes a tongue portion disposed within a substantially ring-like portion. The limiter is attached to a first surface of the tongue portion. The gimbal may further include a slider attached to a second surface of the tongue portion, wherein the second surface is opposite the first surface of the tongue portion.

4 Claims, 5 Drawing Sheets

LIMITER FOR INTEGRAL FLEXIBLE CIRCUIT SUSPENSION ASSEMBLY AND METHOD OF ASSEMBLING

This is a divisional of U.S. patent application Ser. No. 10/375,896, filed on Feb. 26, 2003, now U.S. Pat. No. 6,980,400, which Application claims the benefit of U.S. Provisional Patent Application No. 60/360,161, filed Feb. 26, 2002, both of which are fully incorporated herein by reference.

TECHNICAL FIELD

The present invention relates to disk drives used for data storage and retrieval in computers. In particular, the invention is directed to a limiter for controlling the displacement of a portion of a ring gimbal with attached slider relative to a load beam within a head suspension assembly.

BACKGROUND OF THE INVENTION

Many computers utilize disk drives for data storage and retrieval, such as magnetic recording hard disk drives that utilize a head assembly for reading and/or writing data on a rotatable magnetic disk. In such systems, the head assembly is typically attached to an actuator arm by a head suspension assembly comprising a head suspension and an aerodynamically designed slider onto which a read/write head is provided. When the head is positioned over a spinning disk during usage, the head position is at least partially controlled by balancing a lift force that is caused by an air bearing generated by the spinning disk and acting upon the slider, and an opposite bias force of the head suspension. In operation, the slider and head are designed to "fly" over the spinning disk at precisely determined distances from the disk surface at speeds that can range from 3600 revolutions per minute to over 15,000 revolutions per minute.

Head suspensions generally include an elongated load beam with a gimbal flexure located at a distal end of the load beam, and a base plate or other mounting means at a proximal end of the load beam. The gimbal flexure includes spring or gimbal arms that support a platform or tongue to which the slider is mounted. During operation of such a disk drive, the gimbal arms permit the slider to pitch and roll about a load dimple or load point of the load beam, thereby allowing the slider to follow the surface of the disk as it rotates, even if the disk surface is warped, has an irregular topography, or the like. The gimbal flexure, including the gimbal arms and tongue, are thus designed to provide a flexible connection to allow the necessary pitch and roll of the slider relative to the rotating disk surface. In addition to the variations in the disk surface, other operational and manufacturing considerations within the assembly itself can cause undesirable pitch and roll. For example, misalignment of components within the assembly can cause torque to be placed on the slider, which can induce the type of pitch and roll that can change the critical spacing between the slider and the disk surface.

Other head suspension assembly considerations are also important for proper alignment and performance of the various components. One other such consideration is the angular orientation of the tongue to which the slider is attached relative to the disk surface, which is also referred to as the "static attitude". If the static attitude is not held to precise tolerances, torque may be imparted to the slider, which can also create undesirable pitch and roll of the slider relative to the disk surface.

In order to provide control of the critical spacing between the slider and disk surface, the pitch and roll stiffnesses of the gimbal flexure should be relatively low, which results in generally undesirable low vertical stiffness. In cases where the gimbal flexure has a low vertical stiffness, the mass of an attached slider can be significant enough to cause the gimbal tongue to separate from the load beam by a distance that causes permanent deformation or damage to the gimbal flexure structure. This damage is particularly likely when shock loads are imparted to the head suspension during its manufacturing processes and/or operation within a disk drive. To protect the fragile gimbal flexure structure from such damage, the head suspension may be provided with a limiter that, when engaged, can limit movement of the slider relative to the load beam, but still allows for low pitch and roll stiffnesses.

Various limiter features have been developed for use in head suspension assemblies, particularly in the gimbal region of such assemblies. For example, in the traditional Watrous-style gimbals known in the art, various limiter features have been used which limit the motion of the gimbal tongue and prevent large linear and rotary deflections of the gimbal tongue and the attached slider, particularly during shock events. In other words, the features of the limiter may serve the purpose of "engaging" during shock events to limit certain types of movement. A head suspension assembly may be subjected to such shock during assembly, testing, and/or shipping, for example, which can cause components of the assembly to become undesirably deformed or displaced relative to each other. Other shock events may occur when the suspension is part of a personal computer disk drive that is dropped or otherwise subjected to a sudden impact load that can cause the components of the suspension to displace relative to each other and relative to a disk surface. In these cases, a limiter can serve the purpose of preventing undesirable displacement of the gimbal tongue and slider components away from the load beam.

Previous versions of limiters involved forming a limiter prior to welding the various suspension components together. In these situations, a complex weaving motion was needed to properly position the tongue or gimbal component so that it could later be "caught" during shock events. This disadvantage was overcome with the use of components that allowed for welding prior to forming the limiters, which facilitated the automation of welding. Specifically, suspension components could be aligned or positioned relative to each other immediately prior to welding the components together.

Details regarding an integral flexible circuit suspension assembly and a polymeric ring gimbal which achieves very low pitch and roll stiffnesses without sacrificing high vertical and lateral stiffness can be found in commonly owned U.S. Pat. No. 6,515,832 to Girard, titled "Gimbal Stiffness Control for Head Suspension Assemblies", the entire disclosure of which is incorporated herein by reference. The various features of this ring gimbal allow for setting nominal static angles while maintaining static angle positions throughout temperature and humidity changes. However, at extremely high G forces, it is possible that this gimbal may be damaged or distorted. Thus, it would be advantageous to optionally add a limiter to a polymeric ring gimbal of this type for certain applications or to add a limiter to other gimbal flexures that could utilize an additional protection feature. It would further be advantageous that this limiter could be added without requiring any weaving of components during assembly of the suspension and without having to form the limiter after welding.

SUMMARY OF THE INVENTION

The present invention is directed to a limiter used to limit the motion of a ring gimbal with attached slider relative to a load beam within a head suspension assembly of a disk drive. This limiter is particularly advantageous in that it can be joined directly to the tongue portion of a ring gimbal without necessarily requiring any weaving of components during assembly of the suspension. In one particular aspect of the invention, a ring gimbal is provided which includes a flexible substrate supporting at least one electrical lead and a limiter assembly joined to a portion of the flexible substrate. The ring gimbal includes a tongue portion disposed within a substantially ring-like portion. The limiter may be attached to a first surface of the tongue portion. The gimbal may further include a slider attached to a second surface of the tongue portion, wherein the second surface is opposite the first surface of the tongue portion.

The flexible substrate of the ring gimbal may be configured from a number of different materials, including a polymeric material. The flexible substrate may also include a plurality of material layers, where at least one of the layers can include copper or stainless steel. The limiter assembly may be configured so that a first limiter element extends from a limiter support portion, which may include at least one removable section that is detachable from the limiter assembly.

The present invention also includes within its scope a head suspension assembly including a load beam having a first surface opposite a second surface and a distal end, wherein the distal end comprises a window opening, a ring gimbal, and at least one limiter assembly. In particular, the ring gimbal comprises a tongue portion disposed within a substantially ring-like portion and is located at the distal end of the load beam and attached to the first surface of the load beam. The tongue portion comprises a first side that faces the first surface of the load beam and is at least partially visible through the window opening of the load beam. The limiter assembly or assemblies include a first limiter element, wherein at least a portion of the limiter assembly is joined within the window opening of the load beam to the first side of the tongue portion, and wherein the first limiter element is positioned to be engageable with a portion of the second surface of the load beam to limit displacement of the tongue portion relative to the load beam.

The present invention additionally includes a method of assembling a head suspension assembly for use in a disk drive. The assembly steps include providing a load beam having a first surface opposite a second surface and a distal end having a window opening and attaching a ring gimbal to at least a portion of the first surface of the load beam at the distal end thereof. The ring gimbal comprises a tongue portion disposed within a substantially ring-like portion, wherein the tongue portion comprises a first side that faces the first surface of the load beam and is at least partially visible through the window opening of the load beam. The assembly steps further include positioning a limiter assembly adjacent to the second surface of the load beam and the first side of the tongue portion so that a first limiter element of the limiter assembly is engageable with a portion of the second surface of the load beam for limiting displacement of the tongue portion relative to the load beam, then joining the limiter assembly to at least a portion of the first side of the tongue portion that is visible through the window opening of the load beam. The limiter assembly may be provided as a preformed unit, or the assembly steps may further include reconfiguring at least a portion of the limiter assembly in some way after the limiter assembly is joined to the tongue portion.

BRIEF DESCRIPTION OF THE DRAWINGS

The present invention will be further explained with reference to the appended Figures, wherein like structure is referred to by like numerals throughout the several views, and wherein.

DETAILED DESCRIPTION OF THE PREFERRED EMBODIMENTS

Figure 1:
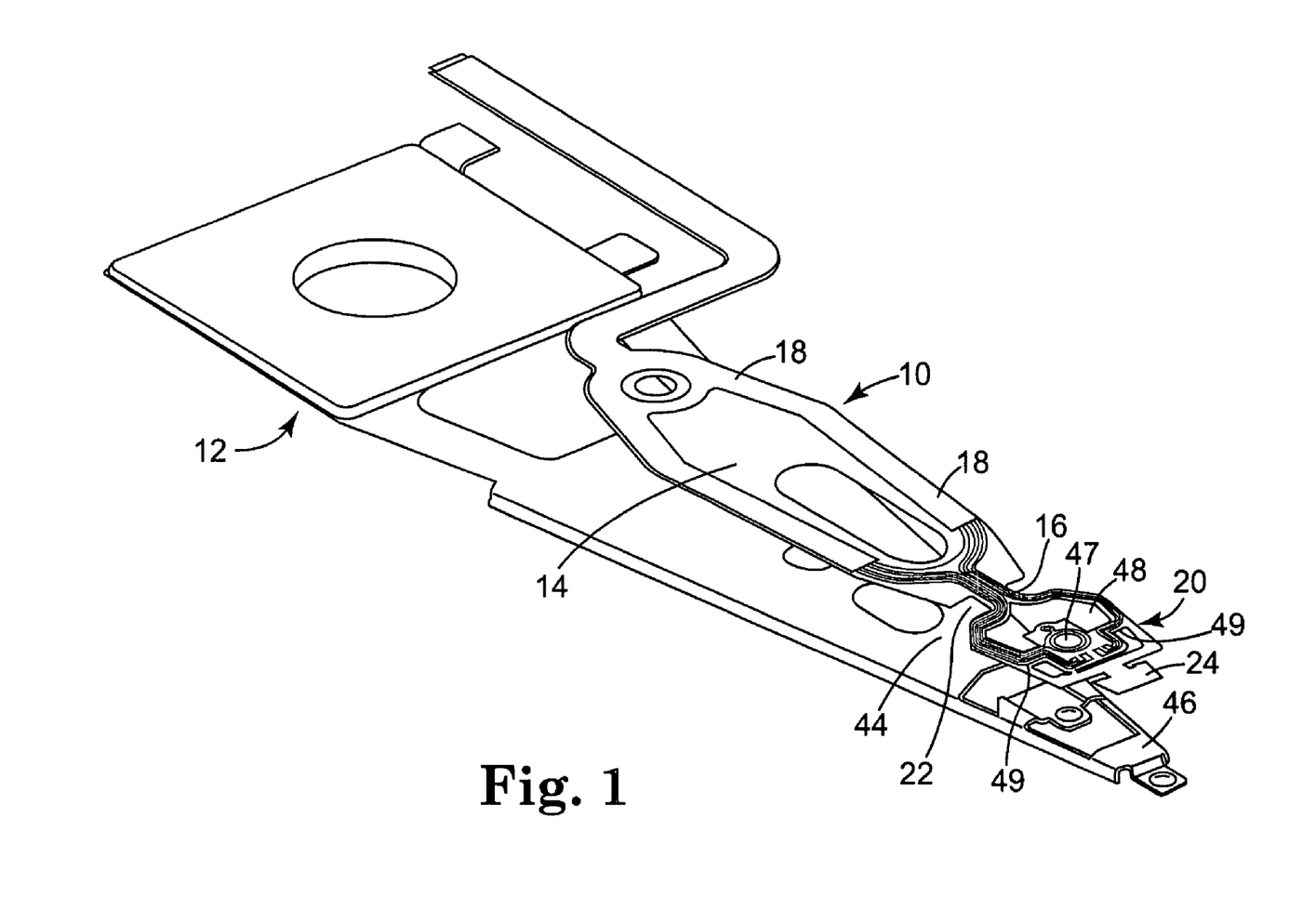
FIG. 1 is an exploded perspective view of a suspension assembly of the type appropriate for use with a limiter of the present invention.

Referring now to the Figures, wherein the components are labeled with like numerals throughout the several Figures, and initially to FIG. 1, one preferred embodiment of a suspension assembly 10 is illustrated in an exploded perspective view. As shown, the suspension assembly 10 includes a load beam 12 and a polyimide substrate 14 including a plurality of electrical traces 16 that are at least partially covered by a cover layer 18. Polyimide substrate 14 includes at its distal end a ring gimbal 20, which is preferably designed to provide low pitch and roll stiffnesses, high lateral stiffness, high vertical stiffness, and to have a low change in static attitude when subjected to temperature and humidity variations. The polyimide substrate 14 also includes a neck portion 22 that provides a pathway for the electrical traces 16 back to the drive electronics and an optional extending attachment tab 24 that is appropriately sized and located for bonding or attaching the ring gimbal 20 to the load beam 12. In the preferred embodiment, the polyimide substrate 14 will be adhered to the load beam 12 at first and second attachment areas 44 and 46, where the second attachment area 46 can be adhered to the attachment tab 24, as described in further detail below.

Various portions of the polyimide substrate 14 could alternatively be attached to the load beam 12, particularly if the substrate 14 does not include an attachment tab; however, important aspects of the ring gimbal performance may be affected. For example, if the ring gimbal 20 is bonded to the load beam 12 in the area in which the slider is mounted, the ring gimbal 20 may then become undesirably stiff in that area, which can affect the ability of the gimbal to pitch and roll as necessary. It is further contemplated that when the ring gimbal 20 is bonded to the load beam 12 at the attachment areas 44, 46, it may also be bonded to the load beam 12 at additional locations, if desired. In any case, any additional stiffness of the ring gimbal 20 at those locations where it is attached to the load beam 12 should preferably be considered in the design of the assembly to achieve the desired performance of the ring gimbal 20.

Figure 2:
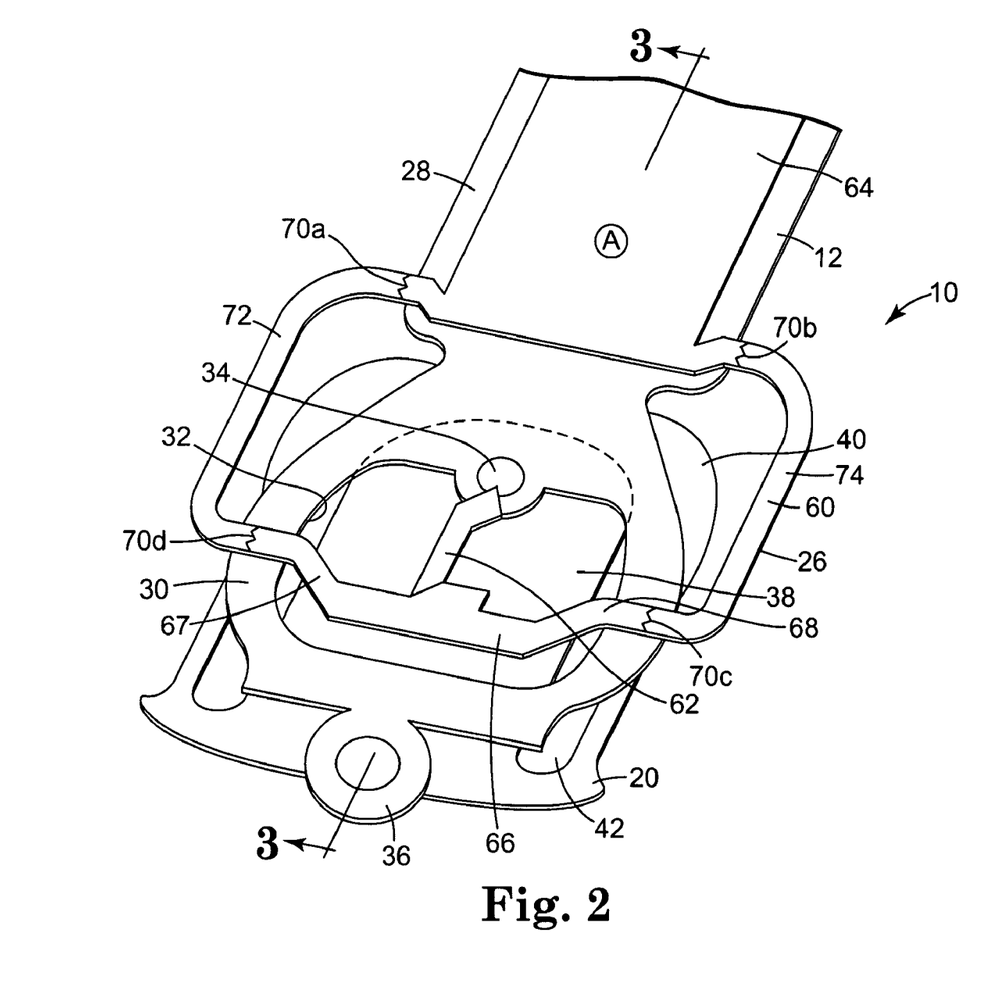
FIG. 2 is a bottom perspective view of a portion of a head suspension assembly including a ring gimbal and limiter assembly.

FIG. 2 illustrates the opposite side of a portion of the suspension assembly 10 similar to the type shown in FIG. 1, including a load beam 12, further illustrating the addition of one preferred embodiment of a limiter assembly 26 in accordance with the present invention. Additionally referring to FIG. 3, a cross-sectional view of the portion of the suspension assembly 10 taken along line 3-3 of FIG. 2 is illustrated. As shown in these Figures, load beam 12 generally includes a first portion 28, a ring portion 30 having an opening or window 32, a load point dimple 34, and a lift tab 36 that can be used to lift the end of the load beam 12 from the disk surface as necessary during the reading and writing of information on a disk. In this configuration, dimple 34 is recessed from the illustrated side so as to protrude from the other side thereof; however, the dimple may take any number of configurations, such as a raised region, may have a different shape than that illustrated, may comprise a series of shaped surfaces, or the like.

Figure 3:
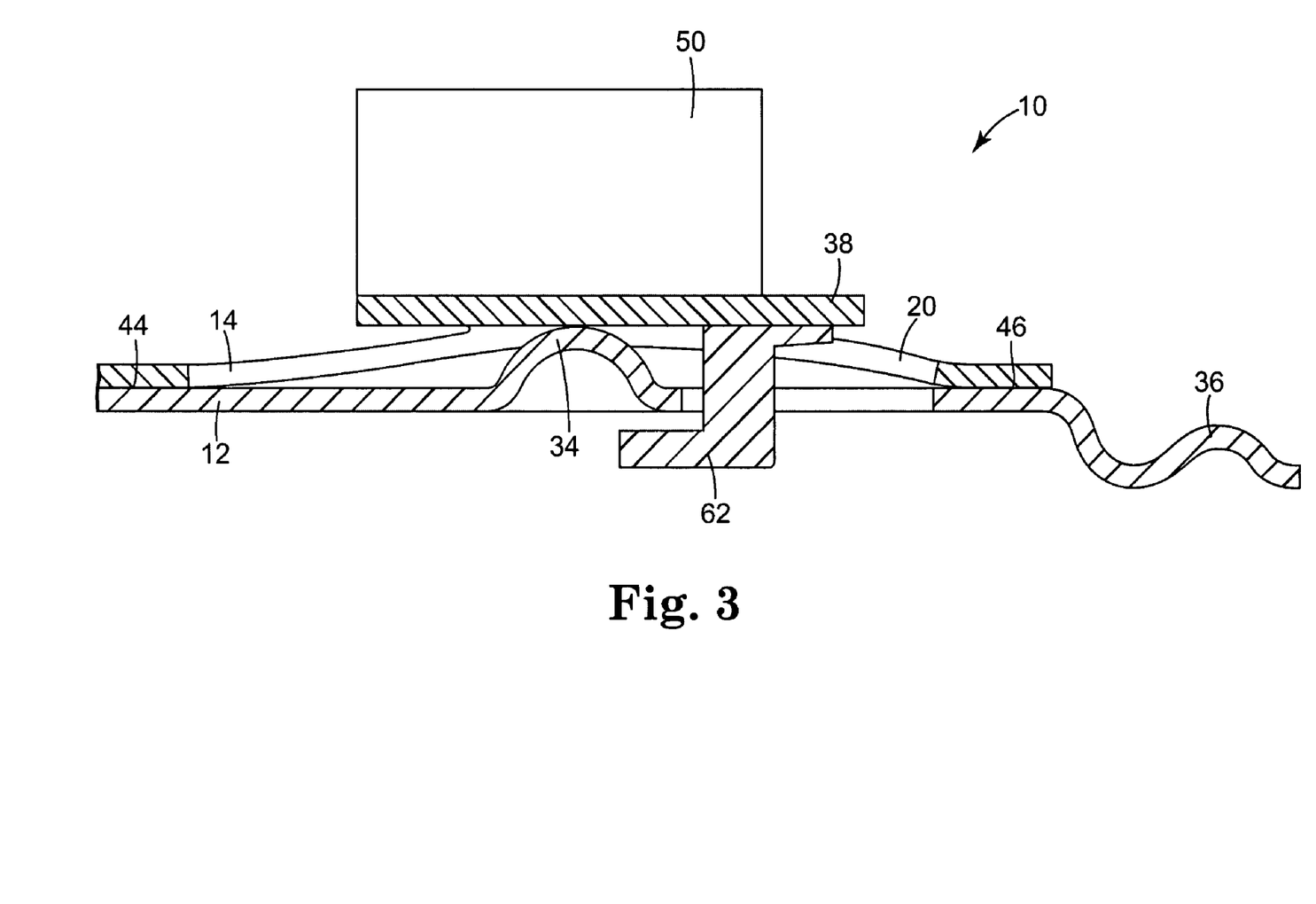
FIG. 3 is a cross-sectional side view of a portion of the head suspension assembly of FIG. 2, as viewed along lines 3-3 of FIG. 2.

The load point dimple 34 is preferably provided in a relatively stiff portion of the load beam 12 to provide a stable point about which the ring gimbal 20 can pitch and roll. When the load beam 12 includes such a load point dimple, the ring gimbal 20 preferably includes a corresponding hole 47 that is appropriately sized and positioned to receive the load point dimple when the ring gimbal 20 is attached to the load beam 12. The load beam 12 may alternatively be constructed without a load point dimple, in which case it would not be necessary for the ring gimbal to include a hole 47.

Ring gimbal 20 is preferably the distal portion of a larger polymeric material substrate, such as the polyimide substrate 14 that extends over at least part of the load beam 12. Ring gimbal 20 also preferably includes a tongue portion 38 to which a head slider can be mounted and that is moveable relative to an outer ring portion 40. As shown, the tongue 38 is located within the outer ring portion 40, wherein the tongue 38 is optionally separated from the ring portion 40 by a generally U-shaped channel 42 to allow the necessary range of motion of the tongue 38 relative to the outer ring portion 40 and the load beam 12. As is visible in FIG. 1, the ring gimbal 20 preferably further includes another channel or opening 48 separated from the channel 42 by a pair of torsion bars 49. Alternatively, the ring gimbal 20 may include more or less than two channels or other types of openings to allow the tongue portion to be moveable relative to the rest of the ring gimbal structure. It is preferable that the ring portion 40 and tongue 38 are made from the same material, and is even more preferable that they are made from a single sheet of material, where the channels 42 and 48 are removed from a solid sheet of material to separate the tongue 38 from the outer ring portion 40. It is contemplated, however, that the tongue 38 and surrounding ring portion 40 are made of different materials, such as in assemblies where it would be advantageous for the two portions to have different material properties (e.g., stiffness, weight, or other properties).

The tongue 38 is preferably biased or angled at least slightly relative to the plane of the ring portion 40, which is preferably generally flat or at a slight curvature. The tongue 38 is preferably flexible enough to allow it to flex at least slightly over the load dimple 34 when it rests thereon during operation. A portion of the tongue portion 38 thus preferably abuts the raised dimple 34 so as to permit pitch and roll movements of the tongue portion 38 relative to the load beam 12. The ring gimbal 20 may also include at least one deformation inhibitor (not shown) to reduce or prevent the additional pitch of the slider that can occur if the polyamide substrate 14, and particularly the ring gimbal 20, absorbs moisture from the air. These deformation inhibitors are preferably trace extensions that extend from the electrical traces 16 distally along part of the ring gimbal 20.

As shown best in FIG. 3, the polyimide substrate 14 in the area of the ring gimbal 20 is preferably attached at certain locations to the load beam 12. Specifically, the polyimide substrate 14 is attached at first and second attachment areas 44 and 46 to the load beam 12. These attachment areas 44, 46 are located on opposite sides of the load dimple 34 and are spaced a sufficient distance therefrom to allow all necessary degrees of motion of the ring gimbal 20 during operation of the disk drive. The polyimide substrate may be a multi-layered structure that includes layers of the same or different materials, where the layer that contacts the load beam may include materials such as copper and/or stainless steel. If the polyimide substrate includes copper within its construction, for example, the polyimide substrate could be adhered to the load beam with any number of appropriate adhesives. If the polyimide substrate also includes another material such as steel, for another example, the substrate may be attached to the load beam with laser welds or other welding techniques at the attachment areas 44, 46. These attachment areas 44, 46 can be used in setting the static pitch angle, such as by varying the height at which those points are attached to the load beam. Although these attachment areas advantageously allow the flexible ring gimbal 20 certain preferred amounts of motion while providing the necessary constraints for controlling the position of the ring gimbal relative to the load beam, it is understood that the polyimide substrate 14 may instead be attached to the load beam 12 at any number of locations, which may or may not include the attachment areas 44 and 46 described above.

The suspension assembly 10 can further include a slider 50 mounted to one face of the tongue portion 38. The slider 50 should be precisely positioned on the tongue portion 38 at a predetermined location and can be adhered or attached by any appropriate method. One exemplary attachment method includes using an appropriate adhesive or epoxy that may be cured either with ultraviolet light or any other known curing method. In any case, it is important that the slider 50 is securely attached to the tongue portion 38 so that it cannot move in any unintended directions relative to the various components of the suspension assembly. As discussed above, precisely controlling the spacing and positioning of the slider 50 relative to the spinning disk is critical for proper operation of the disk drive.

Figure 4:
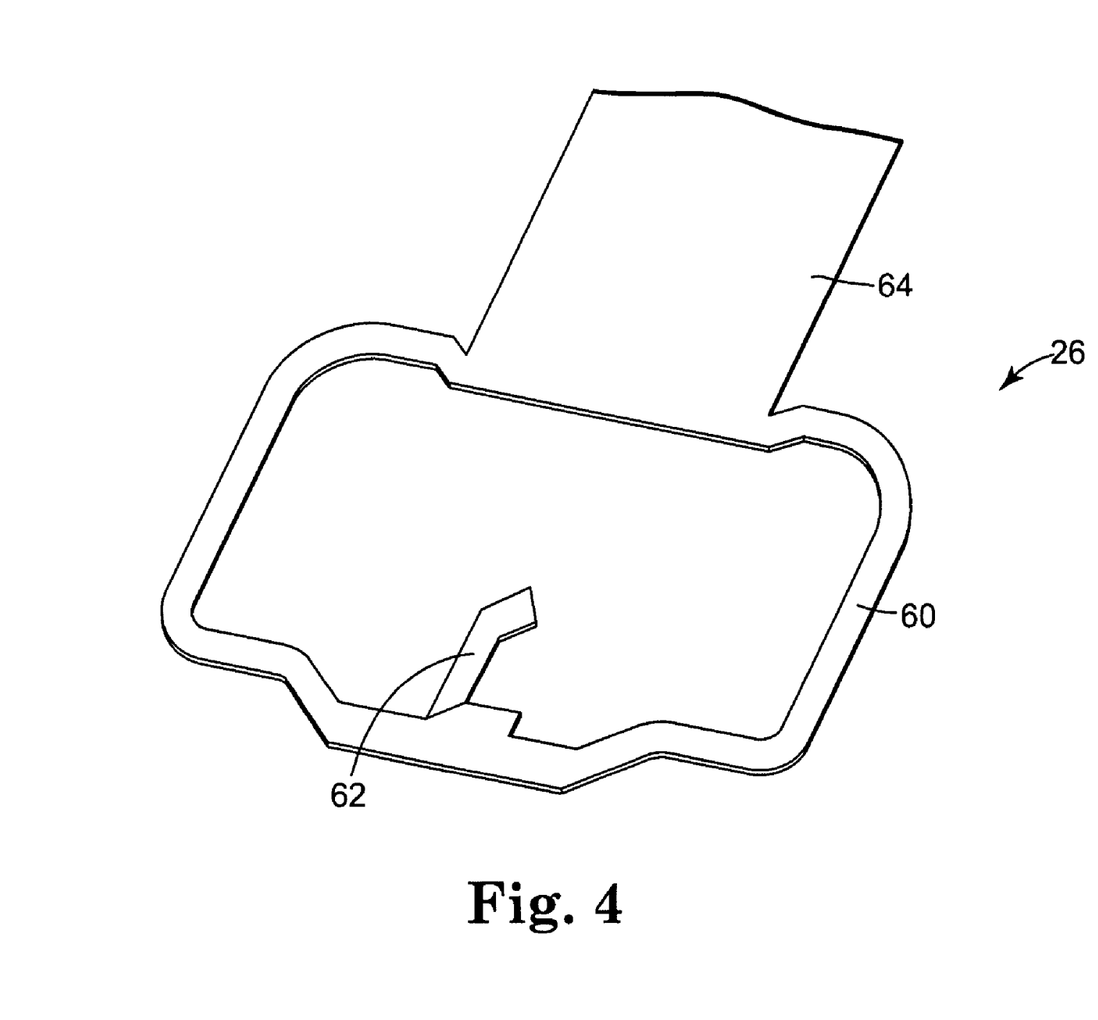
FIG. 4 is a bottom perspective view of the limiter assembly of FIG. 2.

Referring additionally to FIG. 4, the limiter assembly 26 of FIG. 2 is shown. Limiter assembly 26 is preferably a spring steel layer that may be part of a larger spring steel layer that extends along at least a portion of the suspension assembly 10 or part of a spring steel layer having other configurations used in an assembly of this type. For example, the spring steel layer may comprise an additional layer covering some or all of the load beam 12 for spring characteristics or the like. As shown, limiter assembly 26 generally includes a ring portion 60, a limiter element 62, and an extension portion 64. The ring portion 60 and the limiter element 62 that extends from the interior portion thereof are preferably formed into their desired shapes prior to any welding or joining operations with a suspension assembly. However, it is contemplated that all or some of the forming of the ring portion 60 and limiter element 62 may occur after the limiter assembly 26 is attached to the suspension assembly. As shown, both the ring portion 60 and limiter element 62 can include a plurality of bends or contours that are provided as needed to permit attachment of the limiter assembly 26 to the load beam 12 and the ring gimbal 20 while avoiding other structure. In this way, no complex weaving of the limiter assembly 26 with the polyimide substrate 14 and/or the load beam 12 should be required. However, minimal interweaving of the limiter assembly 26 with components of a suspension assembly may be acceptable, depending on the structure and relationship of the various components.

The limiter element 62 is preferably bent from the ring portion 60, such as at a right angle or otherwise, in order to create an element capable of engaging the load beam structure at any point. The ring portion 60 and limiter element 62 may include any number and variety of contours, bends, or other shaping to achieve a limiter assembly 26 that can provide the desired functionality of limiting movement of the tongue 38 and attached slider 50 relative to the load beam 12, as described in further detail below.

Referring also to FIGS. 2 and 3, the limiter assembly 26 is illustrated in one preferred relationship with the load beam 12 and ring gimbal 20. In one preferred assembly operation, the various components of the suspension assembly 10 are assembled and secured as described above, including attachment of the polyimide substrate 14 (having a ring gimbal 20) to the load beam 12. The limiter assembly 26 is then placed in the desired location relative to the load beam 12 and ring gimbal 20 so that ring portion 60 of the limiter assembly 26 extends generally into the region of the ring gimbal 20. The extension portion 64 can be advantageously utilized to properly position the ring portion 60 and limiter element 62 relative to the ring gimbal 20 and load beam 12. Various methods and devices may be used to provide the precise alignment of components that is necessary for these assemblies, where the extension portion 64 can provide a relatively large surface for positioning that may be easier to align than the smaller components, such as the relatively small limiter element. Extension portion 64 of limiter assembly 26 may be joined to the first portion 28 of load beam 12 by any suitable method, such as welding or adhesives. The slider 50 may be attached to the tongue portion 38 at any desired point in the assembly process sequence, but is preferably added to the assembly 10 after the limiter assembly 26 is properly positioned and joined to the suspension assembly 10.

In this embodiment, the joining of the limiter assembly 26 to load beam 12 preferably occurs generally in the area designated by the letter 'A'; however, the two components may be joined at one or more other suitable locations, which areas may or may not include the area A. If the components are attached at the area A, the amount of surface area that is attached can vary widely. For one example, it may be desirable to provide a more temporary type of attachment between the components so that the extension portion 64 can be removed from the assembly after it is used for locating the limiter element 62. For another example, a permanent bonding method may be used so that the extension portion 64 cannot be detached from the assembly.

As shown, part of the tongue portion 38 of ring gimbal 20 is visible and accessible through window 32 of load beam 12. Any section or piece of the ring portion 60 of limiter assembly 26 that extends across window 32 after proper placement of the assembly may be joined to ring gimbal 20 at any point or points where these elements contact each other, which, in the preferred embodiment, includes at least one point of the tongue portion 38. In a preferred embodiment, the joining of ring portion 60 to the tongue portion 38 of ring gimbal 20 is accomplished by adhering the two surfaces to each other; however, the surfaces may instead be joined by another appropriate bonding or attachment method. As shown in FIG. 2, the relatively linear attachment portion 66 of ring portion 60 immediately adjacent to the limiter element 62 is preferably joined to the tongue portion 38. It is understood that this entire attachment portion 66 may be joined to the tongue 38, but it is only necessary that a sufficient amount of this attachment portion 66 be bonded to the tongue 38 to adequately secure the limiter element 62 in its desired position to engage with the load beam 12.

The limiter element 62 is preferably configured and positioned so that a portion of element 62 can contact or engage the dimple 34 if the tongue portion 38 with the limiter element 62 attached thereto is moved. It is understood, however, that limiter element 62 could be formed to contact any other portion of load beam 12, such as any suitable point on its ring portion 30, for example. The limiter assembly 26 may further include additional limiter elements (not shown) that can contact various portions of the load beam 12. If the assembly 26 includes multiple limiter elements, the various limiter elements may be placed in symmetric locations about the ring portion 60 for purposes of balancing the weight of the suspension assembly 10, or the assembly may be designed to accommodate limiter elements that are otherwise positioned about the ring portion 60. Further, if multiple limiter elements are provided, each limiter element may be similarly or differently sized, shaped, and/or configured, as desired, to prevent certain types and amounts of movement of the tongue portion 38. For example, a single limiter element may be a single extending portion with no bends, or a limiter element may include relatively complex bends and contours to produce the desired shape for constraining a particular tongue portion.

Referring specifically to the illustrated embodiments of limiter assembly 26 that include a single limiter element, limiter element 62 may be an integral portion of ring portion 60, where limiter element 16 is simply bent or formed to the desired configuration. Alternatively, limiter element 62 may be a separate piece that is attached or joined to ring portion 60, where the limiter element 62 and ring portion 60 may comprise the same or different materials, and can be attached to each other by any conventional attachment methods. It is further contemplated that all or part of the limiter assembly 26 may be made of materials other than spring steel, such as polycarbonate or other polymeric materials. The material or materials used for a particular limiter assembly 26 should be selected to have adequate stiffness to provide the desired limiting function without breaking or deforming when engaged with the load beam. The selected material should also be as light as possible, however, because any added weight in this portion of the suspension assembly can increase the chances of damage if a shock event occurs. Too much additional weight may also detrimentally affect the performance of the suspension assembly and reduce the advantages gained by using a polyimide substrate for the gimbal.

If the limiter assembly of the present invention is made primarily of relatively formable materials such as spring steel, various bending and forming operations will provide the desired configuration of the limiter components. Alternatively, some or all of the limiter assembly portions may be made of a material that is not particularly bendable or formable without breaking. If this type of material is used, the assembly must be initially constructed in its desired final form, such as by injection molding, thereby eliminating the need for additional bending and forming operations.

After assembly of the components as described above, the sections of limiter assembly 26 that extend beyond the sides of the assembly will preferably be removed. For example, the ring portion 60 may be severed by any shearing process, for example, generally along break lines such as those shown as 70a through 70d. Such breaking of the ring portion 60 creates a removable wing portion 72 that extends between the break lines 70a and 70d, and a removable wing portion 74 that extends between the break lines 70b and 70c. In this way, the section of ring portion 60 that includes the limiter element 62 and attachment portion 66 would remain adhered to the ring gimbal 30 so that limiter element 62 can perform its desired function.

To facilitate severing of the ring portion 60 in the desired locations, the break lines 70a through 70d may be scored or otherwise weakened for accurate breaking of the ring portion 60. Alternatively, the removal process may be automated or otherwise designed so that a tool or machine can sever the ring portion 66 in exact, predetermined locations, without additional markings of the ring portion. When choosing and designing the locations for severing the ring portion 60 for removal of a portion or portions thereof, it is preferable that the break lines (such as lines 70a through 70d in FIG. 2) are in locations that are accessible from both the top and bottom sides of the ring portion 60. This process of severing the ring portion 60 at break lines 70a through 70d and removing the wing portions 72, 74 may take place at any desired point in the assembly, shipping, and distribution process, as desired. For example, the wing portions 72, 74 can be removed immediately after the attachment section 66 is secured to the tongue portion 38 and before shipment of the suspension assembly 10 to a customer. Alternatively, removal of the wing portions 72, 74 may occur in a different process and/or at the same or a different location than where the limiter assembly 26 was attached to the suspension assembly 10. In this way, the various parts of the assembly, some of which are generally flexible, may be kept more stable and aligned relative to each other throughout various shipping and handling operations and the end user or assembler can remove the wing portions 72, 74 when the assembly is less likely to be subject to damage or deformation.

Accordingly, with the side sections of the ring portion 60 removed, a limiter element 62 is provided that extends from the attachment portion 66 of the ring portion 60 that is attached to the tongue portion 38 on its oppositely facing side from the side thereof that is to be attached to a head slider. By attaching the limiter element to this back side of tongue 38, the limiter element 62 can be positioned to engage any part of the load beam and to effectively limit movement of the tongue 38 and attached slider 50 away from the load beam 12, such as may occur under a shock load, and to limit the rotational movement of the ring gimbal 20.

It is also understood that in certain applications, the suspension assembly with limiter can be designed so that no portions of the limiter assembly would need to be removed, such as the wing portions 72, 74 described above. In other words, the entire ring portion 60 would become a permanent part of the suspension assembly 10. However, because the ring portion 60 would add weight to the area of the ring gimbal 20 and would increase the overall size of the entire area of that end of the assembly 10, the corresponding disk drive and other electronic components would need to be designed to accommodate such a suspension assembly.

The ring portion 60 further comprises first and second leg portions 67, 68 on opposite sides of attachment portion 66. Specifically, the first leg portion 67 extends from the break line 70d to the attachment portion 66 and the second leg portion 68 extends from the opposite end of the attachment portion 66 to the break line 70c. As shown, leg portions 67, 68 are formed so that they overlay the ring portion 30 of load beam 12, thus, they are bent or curved at least slightly away from the tongue portion 38, which is positioned below the ring portion 30 in the illustration of FIG. 2. These leg portions 67, 68 can be specifically designed to be separated by a certain distance from the load beam 12 under normal operating conditions, then to contact the portion of the load beam 12 over which they are positioned if deflection of the tongue portion 38 occurs. Thus, these leg portions 67, 68 can provide a second way of limiting the movement of the tongue portion 38 relative to the load beam 12 when deflection occurs, in addition to the limiter element 62 described above. Many variations and numbers of such leg portions are contemplated, such as portions that are longer or shorter than that shown, or with different curvatures or bends than illustrated. Alternatively, the ring portion 60 can be severed within the window 32 of the load beam 12 (i.e., closer to the limiter element 62) such that no leg portions overlap a portion of the load beam 12.

Figure 5:
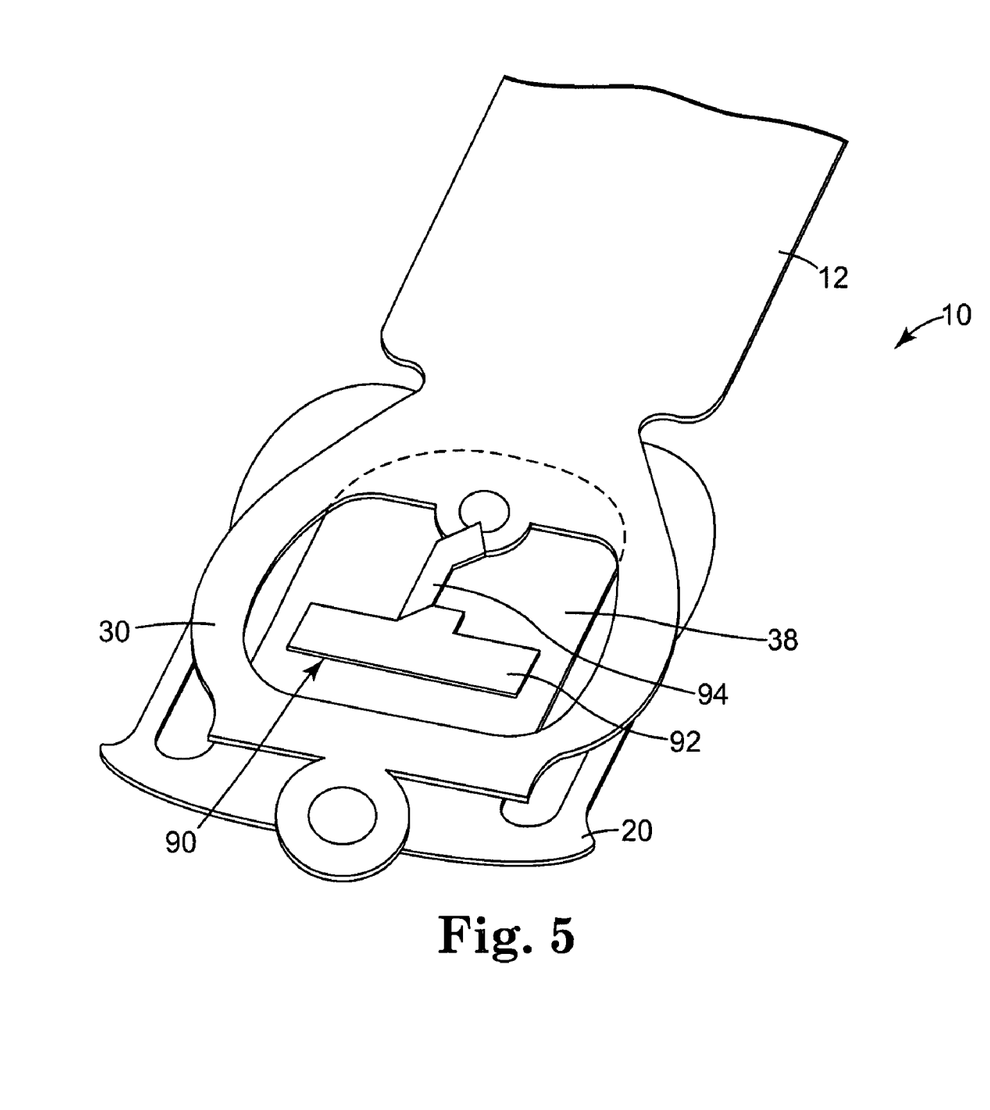
FIG. 5 is a bottom perspective view of a head suspension assembly of the type illustrated in FIG. 2, including another preferred embodiment of a limiter assembly.

FIG. 5 illustrates a portion of a suspension assembly 10 of the type illustrated in FIG. 2, including another embodiment of a limiter assembly in accordance with the present invention. As shown, a limiter assembly 90 comprises an attachment portion 92 and a limiter element 94 that extends therefrom. At least some part of attachment portion 92 is attached to the tongue portion 38 by any known attachment methods. Because this limiter assembly 90 does not include, for example, an extending portion 64 or ring portion 60, the assembly 90 itself must be precisely located relative to the portion of the load beam 12, without additional locating portions. This embodiment does not necessarily require any additional severing steps, since the limiter assembly 90 is preferably preformed to be the desired size, shape, and configuration before attachment to the tongue portion 38. However, any part of the limiter assembly 90 could also be subjected to additional forming steps after the attachment portion 92 is attached to the tongue portion 38. In any case, the limiter assembly 90 should be designed so that the limiter element 94 can contact the load beam 12 at any desired point to limit movement of the tongue portion 38 relative to the ring portion 30 of load beam 12. The various configurations and materials that have been described above relative to the limiter assembly 62 may similarly be applicable to the limiter assembly 90.

The present invention has now been described with reference to several embodiments thereof. The entire disclosure of any patent or patent application identified herein is hereby incorporated by reference. The foregoing detailed description and examples have been given for clarity of understanding only. No unnecessary limitations are to be understood therefrom. It will be apparent to those skilled in the art that many changes can be made in the embodiments described without departing from the scope of the invention. Thus, the scope of the present invention should not be limited to the structures described herein, but only by the structures described by the language of the claims and the equivalents of those structures.

What is claimed is:

1. A method of assembling a head suspension assembly for use in a disk drive comprising the steps of:
   providing a load beam having a first surface opposite a second surface and a distal end having a window opening;
   attaching a ring gimbal to at least a portion of the first surface of the load beam at the distal end thereof, the ring gimbal comprising a tongue portion disposed within a substantially ring-like portion, wherein the tongue portion comprises a first side that faces the first surface of the load beam and is at least partially visible through the window opening of the load beam;

positioning a limiter assembly adjacent to the second surface of the load beam and the first side of the tongue portion so that a first limiter element of the limiter assembly is engageable with a portion of the second surface of the load beam for limiting displacement of the tongue portion relative to the load beam;

joining the limiter assembly to at least a portion of the first side of the tongue portion that is visible through the window opening of the load beam; and reconfiguring at least a portion of the limiter assembly after the limiter assembly is joined to the tongue portion, wherein the step of the reconfiguring at least a portion of the limiter assembly includes removing at least one portion of the limiter assembly, wherein the portion that is removed is not joined to the first side of the tongue portion.

2. The method of claim 1, wherein the limiter assembly is provided as a preformed unit.

3. The method of claim 1, wherein the step of reconfiguring at least a portion of the limiter assembly includes bending at least one portion of the limiter assembly.

4. The method of claim 1, wherein the limiter assembly includes a locating portion used in the step of positioning the limiter assembly relative to the load beam and tongue portion.

* * * * *